US011812680B2

(12) United States Patent
Boone et al.

(10) Patent No.: US 11,812,680 B2
(45) Date of Patent: Nov. 14, 2023

(54) TRACTOR-BALER COMBINATIONS

(71) Applicant: CNH Industrial America LLC, New Holland, PA (US)

(72) Inventors: Wouter Boone, Aalter (BE); Joachim Boydens, Zedelgem (BE); Francis De Kesel, Adegem (BE); Thomas Debbaut, Ronsele (BE); Johan O Vanpoucke, Veldegem (BE); Didier Verhaeghe, Ypres (BE); Jeroen Vermander, Middelkerke (BE); Dries Liefooghe, Alveringem (BE); Neel Vanhecke, Heule (BE)

(73) Assignee: CNH Industrial America LLC, New Holland, PA (US)

( * ) Notice: Subject to any disclaimer, the term of this patent is extended or adjusted under 35 U.S.C. 154(b) by 708 days.

(21) Appl. No.: 16/612,664

(22) PCT Filed: May 9, 2018

(86) PCT No.: PCT/EP2018/062074
§ 371 (c)(1),
(2) Date: Nov. 11, 2019

(87) PCT Pub. No.: WO2018/206678
PCT Pub. Date: Nov. 15, 2018

(65) Prior Publication Data
US 2020/0205336 A1 Jul. 2, 2020

(30) Foreign Application Priority Data
May 9, 2017 (BE) .................................. 2017/5335

(51) Int. Cl.
*A01B 69/00* (2006.01)
*A01F 15/08* (2006.01)

(52) U.S. Cl.
CPC .......... *A01B 69/001* (2013.01); *A01B 69/004* (2013.01); *A01F 15/0825* (2013.01)

(58) Field of Classification Search
CPC .. A01B 69/001; A01B 69/004; A01F 15/0825
See application file for complete search history.

(56) References Cited

U.S. PATENT DOCUMENTS

| 6,389,785 B1 | 5/2002 | Diekhans et al. |
| 2003/0145571 A1* | 8/2003 | Diekhans ............. A01D 43/073 |
| | | 56/10.2 R |

(Continued)

FOREIGN PATENT DOCUMENTS

| EP | 1529428 A1 | 5/2005 |
| EP | 2517543 A2 | 10/2012 |

(Continued)

OTHER PUBLICATIONS

International Search Report for Application No. PCT/EP2018/062074 dated Aug. 27, 2018 (11 pages).

*Primary Examiner* — Truc M Do
(74) *Attorney, Agent, or Firm* — Peter K. Zacharias

(57) ABSTRACT

A tractor has a controller and at least one sensor-for sensing at least one swath line of crop material corresponding to a quantity of crop material per unit length of a swath. The controller operates in dependence on at least one output of the at least one sensor to operate a steering mechanism of the tractor such that a baler towed by the tractor follows a said swath line in a manner aligning ingestion of crop material into the baler for baling. The at least one sensor is operable to sense a swath line that is laterally offset from the direction of forward movement of the tractor.

16 Claims, 3 Drawing Sheets

(56) References Cited

U.S. PATENT DOCUMENTS

Figure 1:
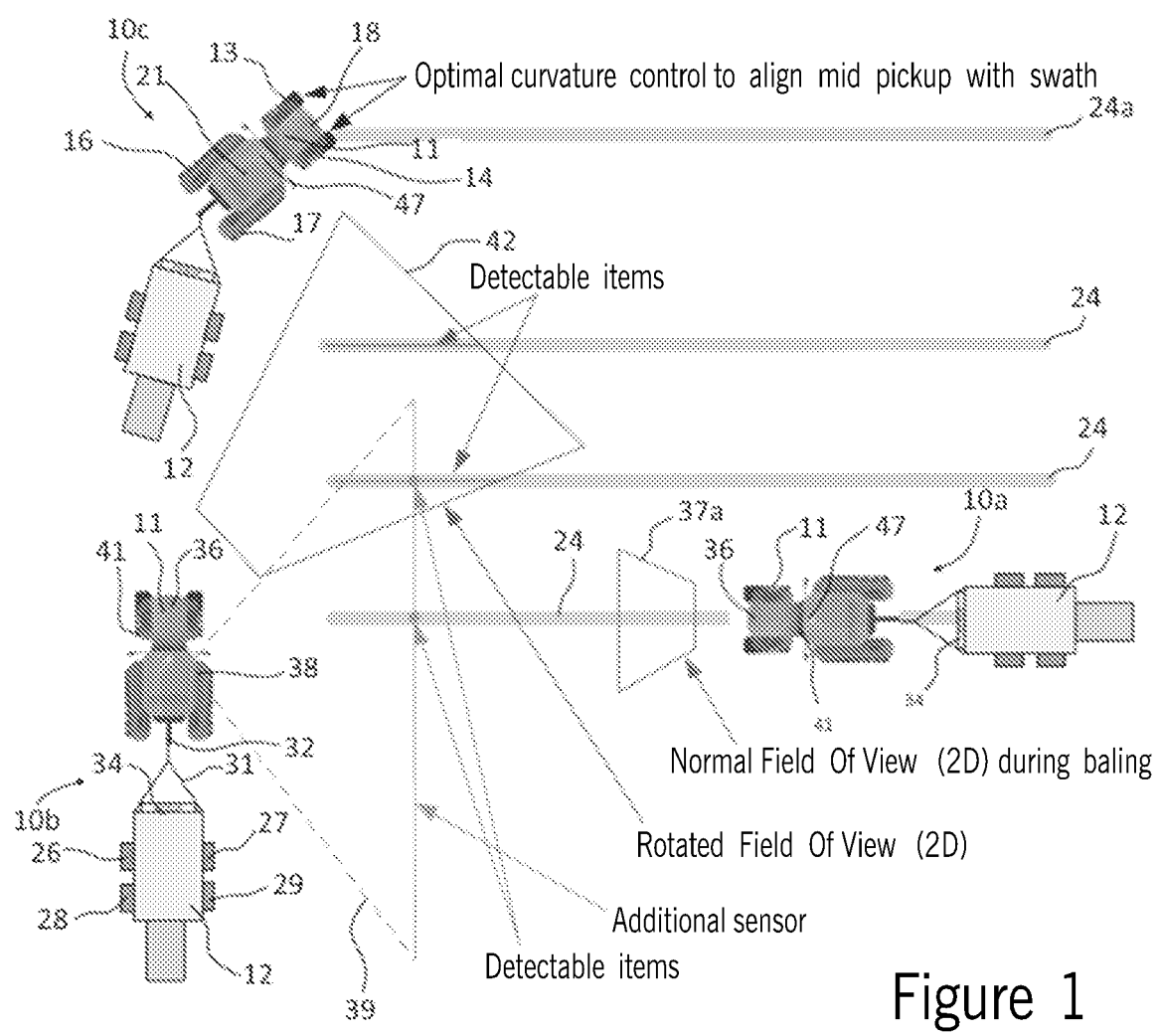

| | | | |
|---|---|---|---|
| 2009/0204281 A1* | 8/2009 | McClure | G05D 1/027 |
| | | | 701/25 |
| 2011/0112721 A1* | 5/2011 | Wang | B62D 13/04 |
| | | | 701/41 |
| 2014/0012732 A1* | 1/2014 | Lindores | A01B 79/005 |
| | | | 705/37 |
| 2015/0321694 A1* | 11/2015 | Nelson, Jr. | B62D 6/00 |
| | | | 382/104 |
| 2017/0027101 A1* | 2/2017 | Wilkening | A01F 15/00 |
| 2017/0235471 A1* | 8/2017 | Schøler | G06F 3/0481 |
| | | | 715/772 |

FOREIGN PATENT DOCUMENTS

| | | |
|---|---|---|
| EP | 2798928 A1 | 11/2014 |
| EP | 3123858 A1 | 2/2017 |

* cited by examiner

TRACTOR-BALER COMBINATIONS

BACKGROUND OF THE INVENTION

The invention relates to a tractor-baler combination.

It is well known in the field of agricultural machines to tow a wheeled baler behind a tractor for the purpose of creating bales of valuable stalk (or other plant constituent) products such as hay, silage vegetation and straw that are deposited in fields as harvesting or mowing operations take place. In the majority of cases the baler is neither autonomous nor self-powered, and instead is towed behind an agricultural tractor from which it derives rotary power to drive its pickup components and internal machinery.

The hay, straw or similar products requiring baling usually are left in fields in the form of swaths or windrows, i.e. elongate rows of the products in question that are heaped in the transverse centre and tend to flatten at the respective transverse edges. Although according to some definitions there are differences between e.g. swaths and windrows, except where the context requires these terms are used interchangeably herein.

Each swath usually extends in as straight a line as possible for almost the entire length of a field. Typically a field that has undergone harvesting contains many, essentially mutually parallel, swaths. The swaths are spaced from one another by largely consistent gaps that normally are determined by the widest part, that usually is the header or front cutter bar, of the harvesting or mowing machine employed to cut the harvest products in question.

The width of a swath is nearly always less than the track of the wheels of a tractor that must subsequently pass along the swaths. As a result such a tractor may travel with one set of wheels on either side of the swath during baling work. At other times it is desirable for the tractor to run alongside the swath, with the baler towed behind and offset laterally relative to the tractor such that only the wheels of the baler straddle the swath.

In some cases, especially when the harvest product is hay, it is known to use a haybob, tedder or rake attached to a tractor after the swaths have lain for a certain period, in order to turn over the swaths left by the mowing machine and thereby achieve a desired degree of aeration of the stalks (or other plant parts if these are of interest). In such cases the resulting windrows while generally following the lines of swaths left by the mowing machine may be of differing dimensions from those of the as-deposited stalks, etc.

The invention is applicable in the use of balers to bale stalks (or other plant parts, as desired) as deposited in swaths; or in windrows created by a secondary operation such as raking, tedding or hay bobbing.

Balers fall in to several categories. The most common types presently in use are those for creating so-called "round" bales, usually of hay or straw (that are approximately cylindrical); and those for creating so-called "rectangular" or "square" bales (that are cuboidal). Each bale type is associated with particular storage and handling characteristics.

Among rectangular balers the most common types produce either "large rectangular bales" or "midi rectangular bales". As the names imply, the former are larger than the latter.

Regardless of the exact type, in use a baler is hitched to the rear of a tractor and the power take-off (PTO) shaft of the tractor connected to provide rotary drive to the baler. The PTO shaft rotates at a speed determined by the settings of the tractor engine and in some cases certain other variable parameters that are settable e.g. by the tractor driver or as a result of automatic or semi-automatic control actions initiated in the tractor or baler such as when one or more sensors produces a particular output, class of output, value or range. Typically the PTO shaft includes a universal joint or similar flexible drive-transferring arrangement, with the result that the connection to the baler does not have to be directly in line with the PTO connection on the tractor, and instead may be offset laterally from it.

The PTO shaft provides rotary drive for the various parts of the baler that move to cause ingestion and baling of stalks. U.S. Pat. No. 4,433,533 A includes an explanation of the operation of a round baler. An example of rectangular baler operation is described in FR 2684517 A.

The invention is applicable to tractor-baler combinations including round balers and rectangular balers of all types including but not limited to those described above, and indeed may be used whenever it is required to tow a baling machine in the vicinity of swaths or windrows.

When towing a baler it usually is an objective of the tractor driver to maintain a particular part (such as the transverse front centre point) of the baler in line with the centre line of the swath to be baled. Some balers, such as those described in U.S. Pat. No. 4,433,533 A and FR 2684517 A, include features permitting the transverse centre of a towed baler to be moved towards and away from an offset position relative to the centre line of the tractor during towing to pick up stalks. This is desirable in order to control the part of the front opening of the baler into which stalks (or other plant parts) are ingested, and thereby assure even filling of the chamber(s) of the baler. This is beneficial because uneven filling can lead to the creation of bales that are of the incorrect shape, and/or are insufficiently strong for handling and storage, and/or are of varying density and hence low commercial value.

In some cases crops are sown in a field in a manner that leaves a respective margin (called a headland), on each of two opposite sides of the field, in which no crops are grown. In many fields, in the alternative, crops are sown over the entire field area, up to the edges of the field. In such cases when harvesting of the field occurs the harvesting machine initially completes e.g. one or two circumferential passes around the outer periphery of the field in order to create a crop-free margin that is akin to a headland except that it extends about the entire periphery of the field for the width of the number of passes of the harvesting machine.

A space such as a headland or the aforementioned harvested periphery is needed for various reasons, one of which is to permit the maneuvering of agricultural vehicles and vehicle combinations without running over, and hence wasting, cultivated crop.

When crop is harvested using a harvesting machine stalks or other plant matter that are required to be baled are left in swaths in the field as outlined above. As a result of the absence of crop in the headlands of the field these regions are normally free of swaths. If a peripheral crop-free margin is created initially during harvesting the stalks lying in this margin are baled first in order to provide a swath-free space. During baling operations the headland or peripheral space at each end or side of the field thus provides space in which a tractor-baler combination may manoeuvre in order to position itself for baling of the plant matter in the parallel swaths extending along the field.

Typically the tractor-baler combination enters the field in the headland and lines up to bale the first of the swaths to be baled. This might be a swath at the end of a series of essentially parallel swaths in the field, or it may be part-way along the series of swaths. The choice of which swath to bale first is determined by potentially a number of factors often the main one of which is the location of the field entrance relative to the series of swaths, although other factors such as but not limited to driver preference, the likely or detected moisture content of the swaths, the layout and terrain of the field, the width of the headland and the presence of obstacles may also be relevant.

During use the tractor-baler combination moves along the selected swath and deposits completed bales behind the baler as it does so. Once the first swath has been baled in this way the tractor reaches the headland at an opposite end of the field to that at which baling commenced. At this point the tractor-baler combination must turn in order to travel along the field in the opposite direction in order to bale the next swath to be picked up. This may be the swath that in the series of swaths is immediately adjacent the initially baled swath, or (depending on the transverse spacing of the swaths the headland dimensions and so on) it may be separated from the initially baled swath by one or more intermediate swaths.

If the headland is relatively broad there is room for the tractor-baler combination to turn through 180 degrees in order to approach the next swath to be baled end-on, with the baler aligned for the ingestion of crop before it encounters the end of the swath.

In many fields however the headland is not broad enough to permit the tractor-baler combination to turn through 180 degrees before at least the tractor, and possibly also the baler, encounters the end of the swath. This can be e.g. because the headland is narrow; or because the tractor-baler combination is too long for the scale of the field in which it is required to operate and instead is intended to operate in a larger field having a broader headland. Also the presence of obstacles that encroach into the headland can reduce the space available for turning a tractor-baler combination.

Increasingly nowadays new tractors include or may be retro-fitted with sensors, such as optical sensors, that sense the region in front of the tractor. A processor forming part of or operatively connected to the tractor may construct from the sensor output readings a database, image output, log or map of the terrain towards which the tractor is heading.

Such an output may be useful when the tractor tows a baler since this permits the transverse position of the baler relative to a swath to be optimised. As a result the ingestion of plant matter may take place in a way that ensures filling of the chamber(s) of the baler so as to minimise the risk of varying density or incomplete bales forming. As explained above the creation of such bales is undesirable.

One way in which such a sensor output may be used is to identify the line traced by the centre of gravity of the detected cross-section of the swath. This is referred to herein as the "swath line" or the "line of the swath". The processor may plot or log such a line and use it as an input to a control method for the baler. Such a control method may involve minimising the deviation of a preferred part of the baler, such as the transverse centre of the pickup at the front of the baler, from the swath line. Adjustments of the transverse position of the baler may be effected e.g. by causing steering of the tractor, or by adjusting a mechanism of the baler that causes transverse offsetting as mentioned above. In the former regard many modern tractors include features permitting the automation of steering functions. Such features include powered actuators such as hydraulic or electric motors, linkages and control elements that typically are programmable and take the form of processors installed in or in use operatively connected to the tractor.

An aspect of the sensor mechanisms outlined above existing in the prior art is that they only sense the terrain in front of the tractor. As a result when the tractor reaches the end of a swath during baling work, or when the tractor is travelling in the headland in a direction that is not aligned end-on with a swath, it is not possible for the sensor and its associated processor to map a swath line at all.

At such a time in order to commence the baling of a fresh swath it is necessary for the tractor driver to turn the tractor at least until a swath is in the field of view of the sensor in front of the tractor. In practice the tractor driver is thereafter unlikely to relinquish control of the tractor-baler combination back to any automated system as described above until the combination has travelled some distance along the next swath to be baled.

Such an approach is associated with disadvantages in terms of bale-forming efficiency.

This is partly because the tractor driver may not position the tractor very accurately relative to the swath, with the result that adjustments of the transverse position of the tractor-baler combination are required before the position of the baler pickup relative to the swath line is optimised. If as is likely the driver retains control of the steering of the tractor-baler combination for some distance after the tractor has encountered a swath this may result in inefficient filling of the baler over a significant percentage of the length of the swath.

Also a system relying on the output of a forwardly directed sensor on the tractor may result in sub-optimal positioning of the baler even if the driver relinquishes control back to the sensor and processor combination shortly after the sensor detects a fresh swath. This is because the processor may be reliant on signals from sensors in the baler in order to determine whether the transverse position of the baler is optimised, and it may require several metres of travel of the baler along the swath before meaningful or sufficient data are acquired.

The processor during such a time may not acquire useful feedback on the position of the baler. As a consequence the transverse position of the pickup may be sub-optimal for longer than is necessary.

A further potential problem is that the driver simply may commence a turn into a swath earlier or later than is desired from the standpoint of optimising baler filling. Again the loss of valuable baled plant matter may result.

According to the invention in a first aspect there is provided a moveable tractor-baler combination including (a) a self-powered tractor having a plurality of ground-engaging members and a steering mechanism for steering at least one said ground-engaging member so as to cause changes in a direction of movement of the tractor; (b) a baler that is towed behind the tractor as the tractor moves forwardly and is pivotably connected to the tractor; (c) one or more sensors for sensing one or more lines (herein swath lines) of crop material corresponding to a maximal quantity of crop material per unit length of swath; and (d) a control apparatus that operates in dependence on at least one output of the one or more sensors to operate the steering mechanism of the tractor such that the baler follows a said swath line in a manner optimising the ingestion of crop material into the baler for baling, wherein one or more said sensors is at least temporarily operable to sense a swath line that is laterally offset from the direction of forward movement of the tractor.

Such an arrangement is capable of detecting a swath and determining its swath line even when the tractor is facing in a direction that prevents a forwardly directed sensor from sensing the swath.

As a result control operations aimed at optimally turning the tractor-baler combination to commence baling of a swath may be initiated at a better time (typically but not necessarily an earlier time) in the headland maneuvering of the tractor-baler combination than has been possible in the prior art.

Moreover the presence of a sensor that detects laterally offset swaths means that more of the control of a headland manoeuvre may take place in an automated way, under the control of software and the engineering parts that are available to control the direction of a tractor-trailer combination, than has been possible in the prior art. This generally increases the accuracy of optimisation of the filling of the baler.

In an optional embodiment of the invention one or more said sensor is moveable between a first orientation in which it points forwardly of the tractor and a second orientation in which it points to one side of the tractor.

Such a sensor may be secured to the tractor by means of e.g. a pivotable mounting. Such a mounting may confer one or more than one degree of freedom on the movement of the sensor between the first and second orientations. Thus in some embodiments of the invention the sensor may be rotatable in a single plane e.g. between a straight ahead orientation and a sideways-pointing orientation. In other embodiments the sensor may be rotatable in two planes such that its direction and dip or elevation angle may be adjusted. The latter may be useful for example when the tractor-baler combination is travelling on uneven ground.

In practical embodiments of the invention optionally the tractor includes one or more motors for effecting movement of at least one said sensor between the first orientation and the second orientation.

As a result optimisation of the orientation of the moveable sensor for detecting laterally offset swath lines may occur in an automated manner. The motors may take any of a range of forms, including electric, hydraulic and pneumatic devices.

In an alternative embodiment of the invention the one or more sensors include respective first and second sensors for sensing one or more swath lines, the first sensor pointing forwardly of the tractor and the second sensor pointing laterally with respect to, or sideways of, the tractor.

In such an arrangement the first and/or the second sensor may be mounted fixedly on the tractor such that their orientations are not changeable relative to the orientation of the tractor. Equally, one or both the sensors in question may be rotatable e.g. as described above. In such an embodiment one or more motors may be provided for effecting changes in the orientation of one or both the respective sensors. Such motors may be as described herein.

In defining the sensors as being fixedly mounted on the tractor this means that the bodies or housings of the sensors are fixed with respect to the tractor. As explained herein even in such an arrangement it remains possible to adjust e.g. the field of view of a sensor, e.g. by adjusting the relative positions of internal optical or other sensing components of the sensors; and/or by filtering or otherwise selectively processing the output signals of the sensors.

It should be realised that in embodiments of the invention when respective first and second sensors are provided typically at least one said sensor is mounted on the tractor. In practical arrangements it is likely that both the respective first and second sensors are mounted on the tractor, but this need not necessarily be so. Thus it is possible for one or more sensor to be located on the baler. As will be known to the person of skill in the art the output of such a sensor can be fed to a processor forming part of or operatively connected to control the steering of the tractor.

In more detail optionally a said sensor pointing forwardly of the tractor senses a swath line extending forwardly from the front of the tractor; and a said sensor pointing to one side of the tractor senses a swath line extending sideways from the tractor. As used herein the phrases "pointing forwardly of the tractor" and "pointing sideways of the tractor" do not exclude the possibility of one or both the sensors in question being mounted on the baler, although it is expected that in the majority of embodiments of the invention at least one of the sensors would be mounted on the tractor.

It also should be realised that references to a swath line extending "sideways of the tractor" or "laterally with respect to the tractor" are not limited to swath lines (or the sensing of swath lines) extending at right angles to the prevailing direction of movement or (if the tractor is stationary) orientation of the tractor. On the contrary, the sensor pointing to one side of the tractor may sense swath lines extending at a range of angles to the centre line of the tractor and may itself point at any of a range of angles. As noted moreover the swath lines need not be straight. Thus the phraseology includes sensors pointing at various angles to the direction of forward movement of the tractor.

It further should be realised that references to a sensor pointing "sideways of the tractor" do not exclude arrangements in which either (a) at least one further sensor is present for sensing swath lines on an opposite side of the tractor to that sensed by the said sensor; or (b) a said sensor is moveable so that it can sense swath lines on either side of the tractor.

In an embodiment of the invention one or more of the sensors optionally is operatively connected to the control apparatus whereby on the sensor sensing a swath line that is laterally offset from the direction of forward movement of the tractor the control apparatus operates the steering mechanism of the tractor to cause steering of the tractor-baler combination such that the baler aligns for ingestion of crop material corresponding to the swath line.

As used herein references to the baler aligning for ingestion of crop material corresponding to the swath line includes e.g. positioning the front centre of the baler pickup so that it coincides with the swath line, or another control action. In the majority of cases any such control action would have the objective of optimising in some way the ingestion of crop material into the baler so that bales are formed as efficiently as possible.

In embodiments of the invention optionally at least one said sensor is an optical device that generates at least one output signal derived from a two-dimensional image of the cross-section of a swath captured by the optical device. Such an image output signal may readily be processed in a range of ways as will be known to the person of skill in the art, for example to generate one or more visible or displayable images; to identify particular artefacts in the data acquired by the sensor; and/or to transmit, store or analyse images or data relating to them in any of a variety of forms. Such signals typically will be electrical signals, although they may take other forms such as but not limited to optical, acoustic or other physical signals known in the electromagnetic spectrum.

Moreover in embodiments of the invention the sensor need not be an optical device per se and instead may take a range of other forms.

When the sensor is an optical device however in embodiments of the invention it is operatively coupled to a processor that generates a predicted swath line derived from a plurality of two-dimensional images of the cross-section, silhouette or outline of a swath captured sequentially by the optical device as the tractor moves.

As noted such a processor may form part of or be operatively connected to the tractor. In other embodiments of the invention the processor may form part of or be operatively connected to the baler; or it may be located partly in the tractor and partly in the baler. In yet further embodiments of the invention to processor may be located remotely of the tractor-baler location and the sensor may be connected to it e.g. by way of one or more wireless connection arrangements.

For the avoidance of doubt in practical embodiments of the invention the baler optionally is connected to the tractor by a drawbar that is pivotably connected (a) at a tractor connection to the tractor and (b) at a location spaced along the drawbar to an attachment location on the baler. In other embodiments however other connection arrangements are possible. It is preferable that the linkage between the tractor and the baler permits pivoting of the latter relative to the former; although it is possible to devise arrangements within the scope of the invention in which the baler is rigidly (i.e. non-pivotingly) connected to the tractor.

The invention also resides in a method of controlling a moveable tractor-baler combination including (a) a self-powered tractor having a plurality of ground-engaging members and a steering mechanism for steering at least one said ground-engaging member so as to cause changes in a direction of movement of the tractor; (b) a baler that is towed behind the tractor as the tractor moves forwardly and is pivotably connected to the tractor; (c) one or more sensors for sensing one or more lines (herein swath lines) of crop material corresponding to a maximal quantity of crop material per unit length of swath; and (d) a control apparatus that operates in dependence on at least one output of the one or more sensors to operate the steering mechanism of the tractor such that the baler follows a said swath line in a manner optimising the ingestion of crop material into the baler for baling, wherein at least one said sensor is at least temporarily operable to sense a swath line that is laterally offset from a direction of forward movement of the tractor (herein a laterally offset swath line), the method including causing the said sensor to sense a laterally offset swath line while the baler is not following a line of a swath; and using the output of the said sensor as an input to the control apparatus whereby to operate the steering mechanism so that the alignment of the baler becomes optimised with respect to the laterally offset swath line before the ingestion of crop material commences.

Thus the invention extends to a method of operating the apparatus also forming part of the invention, together with any programming needed to implement the method and any media on which e.g. relevant program instructions may be stored.

In particular the method of the invention optionally is such that one or more said sensor is moveable between a first orientation in which it points forwardly of the tractor and a second orientation in which it points to one side of the tractor, the method including effecting movement of the said sensor between the first and second orientations.

Alternatively however the method may be implemented such that at least the orientation of the second sensor is fixed relative to the tractor, as explained above in relation to the apparatus aspects of the invention.

When one or more said sensor is moveable between a first orientation in which it points forwardly of and a second orientation in which it points sideways of the tractor the method may include pivotably mounting at least one said sensor relative to the tractor so as to permit one or more degrees of freedom of movement of the sensor.

More generally the method of the invention may be practised so as to embody method analogues of the apparatus features described herein.

Figure 2A:
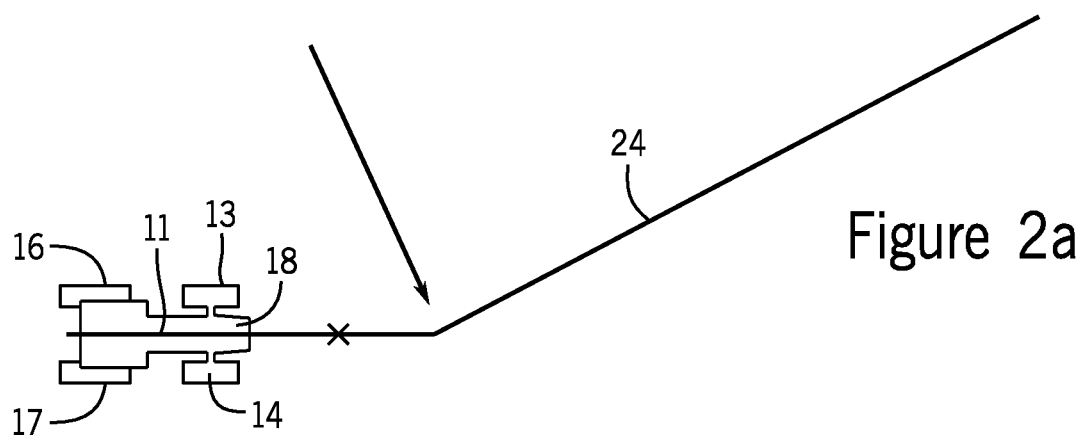
Figure 2B:
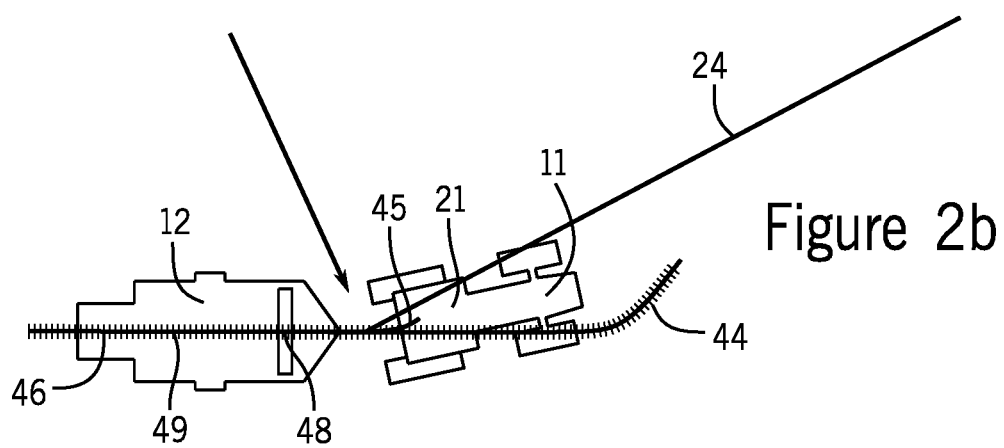
Figure 2C:
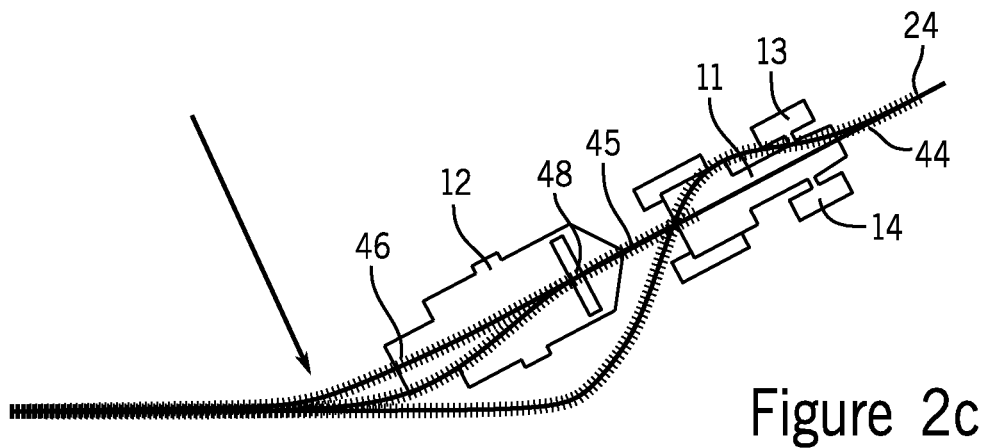
Figure 3A:
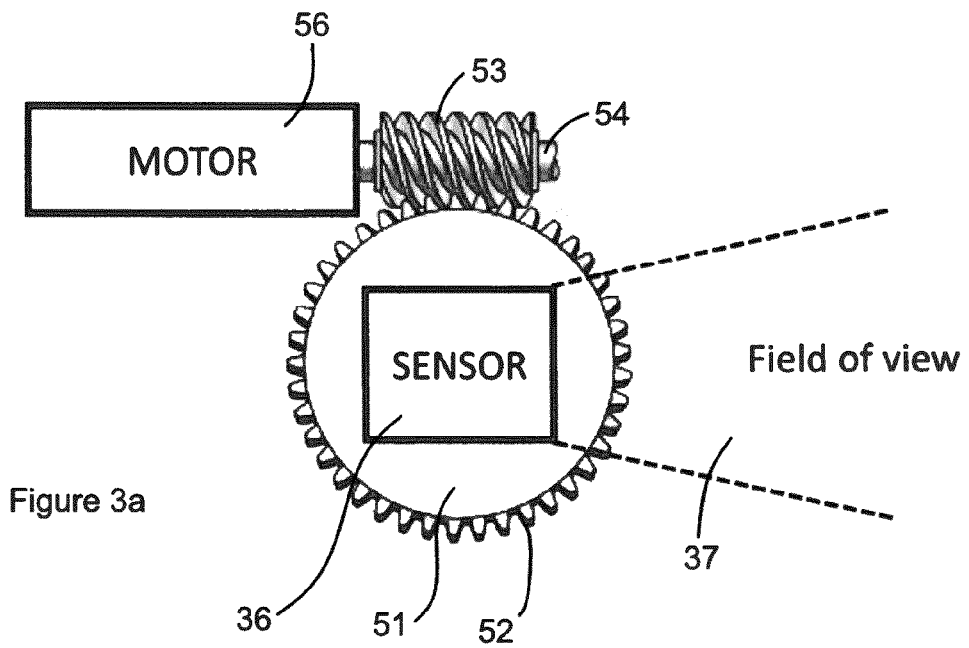
Figure 3B:
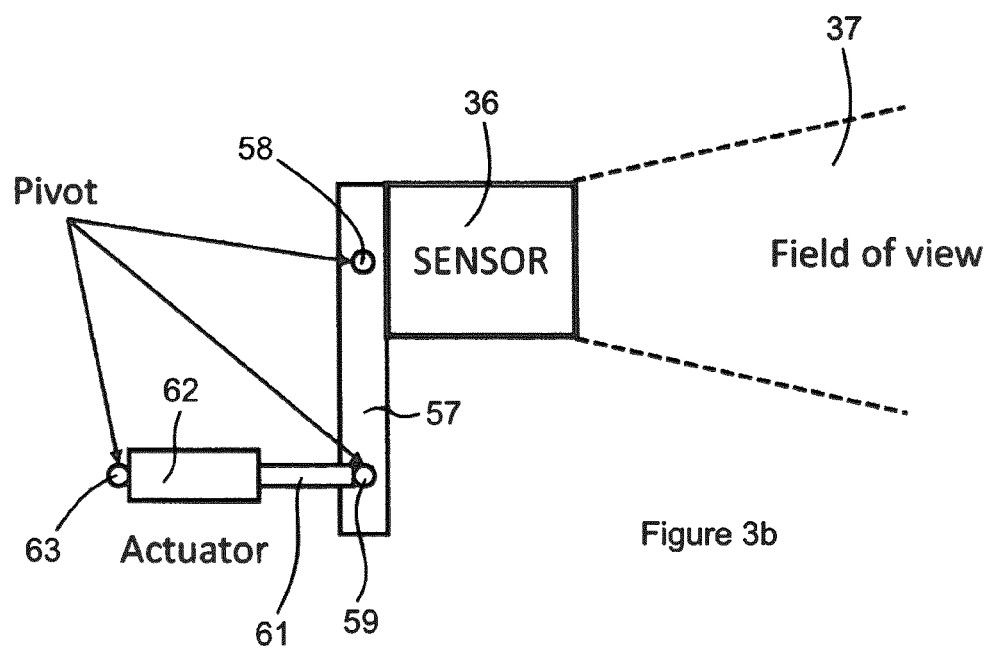

There now follows a description of embodiments of the invention, by way of non-limiting example, with reference being made to the accompanying drawings in which:

FIG. 1 shows in schematic plan view a number of trajectories and locations of a tractor-baler combination according to the invention during regular baling and headland maneuvering activity; and FIGS. 2a to 2c show in more detail the trajectory of the tractor and trailer of a tractor-trailer combination according to the invention, during one particular headland turn; and FIGS. 3a and 3b show exemplary arrangements for effecting pivoting adjustment of a sensor forming part of the invention.

DETAILED DESCRIPTION OF THE DRAWINGS

Referring to the drawings there is shown a tractor-trailer combination 10 comprising an agricultural tractor 11 that in use tows a baler 12. The tractor 11 in many respects is conventional, and therefore includes supported by a vehicle frame a diesel engine, transmission and other components that constitute a drive train together with four ground-engaging members in the form of front and rear pairs of left and right tyred wheels 13, 14, 16, 17.

The vehicle frame and drive train elements are not visible by reason of being concealed beneath an engine hood 18 secured on an upper side of the front part of the engine frame. Mounted on the vehicle frame rearwardly of the hood 18 is a driver's cab 19 including a weatherproof roof 21 that is fixed atop an array of glazed windows 22 set in an approximately square pattern so as to provide a good view all around the tractor 11.

In the example shown the drive train is configured to provide via one or more clutches, a multi-ratio transmission and respective front and rear differential axles powered, rotary drive to all four wheels 13, 14, 16, 17 but in other tractor designs within the scope of the invention only the rear wheels 16, 17 are powered to rotate, with the front wheels 13, 14 being freewheeling as is known in the art.

Also the wheels 13, 14, 16, 17 may be replaced by endless ground-engaging tracks or belts as is known in some tractor designs; or only the rear wheels 16, 17 (or conceivably only the front wheels 13, 14) may be so replaced. All such ground-engaging members and other variants on ground engaging member design as will be known to the person of skill in the art are within the scope of the invention.

Regardless of the exact arrangement of ground-engaging members the tractor 11 is capable of powered movement in forward and, depending on the transmission ratio selected, reverse directions as is well known.

The front wheels 13, 14 are steerable as best illustrated in FIG. 2. To this end the tractor 11 includes a pivoting mounting of each front wheel 13, 14 that allows the respective wheel 13, 14 to pivot about an upwardly extending axis. A steering mechanism including a steering rod, steering box, steering column and steering wheel are provided, with the steering wheel being located in the cab 19 and the steering column extending from the steering wheel to connect with the steering box.

Such steering parts are connected in a per se known manner in order to provide steerability of the front wheels.

This aspect of the steering mechanism does not require detailed describing herein since it is well known to the person of skill in the art. The steering components are not visible in the figures by reason of being obscured under the hood 18 and roof 21.

The steering box additionally includes a steering motor, such as but not limited to an electric motor that is connected to drive the steering box and thereby effect steering of the vehicle without a need for the tractor driver to turn the steering wheel. The steering motor also is not visible in the figures, and is connected to a processing device. This may be, or may form part of, a processor or processing device 41 (these terms being used interchangeably herein) described below and forming part of or operatively connected to the tractor. Other processing device arrangements for controlling conventional functions of the tractor are also possible within the scope of the invention, as will occur to the person of skill in the art.

The processing device is programmed or otherwise arranged to generate commands that cause the motor to effect steering actions based on e.g. the output signals of one or more sensors also forming part of the tractor 11. The invention relies on the presence and operation of particular sensors as described below that give rise to such steering commands.

As explained hereinabove the tractor 11 in use tows the baler 12. The baler 12 includes a machine frame that is obscured by a shroud or body 23 as best seen in FIG. 2. The frame supports in the embodiment shown two parallel axles that in turn locate left and right, front and rear rotatable wheels 26, 27, 28 and 29.

The baler 12 includes a forwardly projecting tongue 31 that is connected to a (schematically illustrated) drawbar or similar arrangement 32 projecting rearwardly from the tractor 11. The connection between the tongue 31 and the drawbar 32 includes a pivot permitting the baler to turn relative to the tractor at least in the plane of the drawbar. In some versions of the invention the pivot permits more than one degree of freedom thereby allowing the connection between the baler and the tractor to accommodate e.g. changes in terrain height as the tractor-baler combination moves forwardly. In more basic versions only a single degree of freedom of pivoting is possible, such that the orientation of the baler 12 in a generally horizontal plane may adjust relative to the tractor 11. A variety of types of connection of the baler 12 to the tractor 11 lie within the scope of the invention.

A power take-off (PTO) shaft 33 also projects rearwardly from the tractor and connects to the baler 12. As is well known in the tractor art the PTO shaft 33 may transfer rotary drive from the engine of the tractor 11 to a towed vehicle such as the baler 12, and thereby provide rotary power for operating the parts of such a vehicle.

As explained, the torque and rotation speed of the PTO shaft may be set e.g. as a result of the setting of controls by the tractor driver; as a result of commands generated by a processing device (such as but not limited to the processing device 41 mentioned above and described in more detail below); or in some cases in a fixed relation to the prevailing rotational speed of the engine. When the PTO shaft is connected to power a baler such as baler 12 it is preferred that the shaft 33 rotates at a set speed that is independent of the forward speed of the tractor 11, since variations in the PTO shaft speed might cause inconsistent baling of harvested products.

The baler 12 at its front lower edge includes a pickup 34. Pickup 34 is used to cause ingestion of harvested plant parts (i.e. crop material) from the swaths, such as swaths 24 illustrated in the representations, into the interior of the baler, where typically rotary components powered from the PTO shaft 33 form them into bales. The bales are ejected from the rear of the baler 12 onto the surface of the field as the baler is drawn forwardly along a swath 24 by the tractor. During such movement of the baler the PTO shaft may provide rotary power for powering the internal, bale-forming parts of the baler as is known in the art.

The tractor 11 includes mounted on e.g. the front of the cab or a forward section of the engine hood 18 a first sensor 36 that points forwardly of the tractor 11 and therefore senses objects, terrain and or other features in the path in front of the tractor 11 as it moves.

First sensor 36 may take a range of forms as will be known to the person of skill in the art, and in presently preferred embodiments of the invention is an optical device. Thus first sensor may be e.g. an optical camera such as but not limited to a charge-coupled device (CCD) that generates electrical outputs based on the image visible in a field of view 37. During normal use of the particular tractor-baler combination 10 illustrated field of view 37a is defined by a notional pyramidal or other shape of field of view 37a.

In the embodiment illustrated the field of view 37a may be represented as a notional two-dimensional plane projecting forwardly from the front of the tractor 11 as illustrated. It should however be noted that the field of view 37a for a variety of reasons may not adopt the shape illustrated, and may instead have a range of other forms depending on the nature of the sensor 36. Moreover the extent to which the field of view 37a extends forwardly of the tractor may be greater or less than the area indicated in the figures. Although in the figures represented as two-dimensional field of view 37a, in reality the field of view is three-dimensional and therefore takes account of e.g. the height of a swath 24 sensed by the first sensor 36.

This is a consequence of the preferred form of sensor 36 generating fixed number of pixels. These are evenly distributed in the pyramidal field of view originating from the sensor 36. As a result there exists a fixed angle between all the adjacent pixels in both the horizontal and vertical directions. It follows that for each pixel three-dimensional information is constructed because a distance to thee detected object is determined. In other words the result is a set of horizontal and vertical angles and a distance value ascribed to each pixel, thus giving rise to three-dimensional information in respect of each pixel.

The sensor 36 in some embodiments of the invention is secured at a fixed orientation relative to the tractor 11. In such a case the field of view 37a may also be fixed, although in some embodiments even when the position of the sensor is fixed it may be possible to adjust the field of view 37a e.g. by adjusting one or more internal components of the sensor 36; or by filtering or enhancing the signals generated by the sensor 36, or processed derivatives of such signals, during use. Sensor 36 is moveable between a first orientation in which it points forwardly of the tractor 11 and a second orientation in which it points sideways of the tractor 11.

One purpose of the first sensor 36 is to assist in optimising the positioning of the baler relative to the swaths 24, while the tractor-baler combination 10 follows a swath 24 for the purpose of creating bales.

To this end the tractor-baler combination 10 includes a processor illustrated schematically by reference numeral 41.

Processor 41 is in the figures shown as being located entirely within the tractor 11 but as noted it may in embodiments of the invention be located e.g. in or on the baler 12, or it may be distributed between the tractor 11 and baler 12, or it may be located partly or entirely remotely of the tractor-baler combination 10.

Processor 41 is arranged to receive signals output by the first sensor 36 and derive therefrom one or more command signals for controlling the lateral position of the baler 12 relative to the tractor 11 while the tractor-baler combination 10 travels along a swath 24 during baling.

The connection of the baler 12 to the tractor 11 may be e.g. pivotable and/or otherwise laterally displaceable relative to the tractor 11. The tractor-baler combination may include one or baler position motors that when activated cause the lateral position of the baler 12 relative to the tractor 11 to adjust. The command signals generated in the processor may be input to the motor to effect changes in the lateral relative position of the baler in a manner optimising the ingestion of crop material.

In the majority of conditions the optimisation of the lateral position of the baler 12 relative to the tractor 11 will result in the centre of the pickup 34 aligning with the part of the swath 24 that contains the highest density of crop matter. This is usually the elongate centre line of the swath 24.

This situation is illustrated with reference to position 10*a* of the tractor-baler combination 10 visible in FIG. 1 of the representations, and also in FIG. 2*a*. To achieve the desired purpose of optimising the ingestion of crop material the baler position motor acting on commands generated in the processor in turn based on the output of the first sensor 36 as needed adjusts the relative lateral position of the baler 12.

In embodiments of the invention the tractor 11 in which the field of view of the sensor 36 is fixed, and in several embodiments in which the sensor 36 is fixed but the field of view 37*a* is adjustable by adjusting internal parts of the sensor 36 or by filtering its output signals as indicated, the tractor is equipped with a second sensor 38.

Such a sensor 38 is able to sense a swath profile of at least one swath 24 that is laterally offset relative to the direction of forward movement of the tractor 11. The purpose of such a second sensor 38 is to detect swaths 24 when at least the tractor 11, and typically the entire tractor-baler combination 10, is travelling in the headland approximately at 90 degrees (or another angle) to the direction in which the swaths 24 extend.

This situation is illustrated in FIG. 1 by the orientation 10*b* of the tractor-baler combination 10 essentially at 90 degrees to the elongate direction of the swaths 24, as occurs when the tractor-baler combination is maneuvering in the headland of a field.

The field of view 39 of the second sensor 38 is illustrated as a two-dimensional triangular plane extending sideways from the tractor 11 as illustrated. When the tractor-baler combination 10 is moving as represented by numeral 10*b* in the headland such that the swaths 24 extend sideways relative to the tractor 11 the second sensor 38 may detect the swaths end-on, even though the first sensor 36 is not at such a time aligned to detect the swaths 24.

Reference 10*b* illustrates a field of view 39 extending to the right hand side of the tractor 11 as viewed. The second sensor 38 is likely in embodiments of the tractor-baler combination 10 to be fixed relative to the tractor 11. As a result in such an embodiment the orientation of the field of view 39 cannot be altered, except in some embodiments by adjusting internal parts of the sensor and/or filtering (or other signal processing) as mentioned in relation to sensor 38. In such a situation a third sensor may be provided pointing to the left hand side of the tractor 11 (as viewed in FIG. 1). Such a sensor is operable to detect swaths 24 when the swaths extend on the left hand side of tractor-baler combination 10. The remainder of this description relates predominantly to the situation of swaths extending away from the tractor 11 on the right hand side as illustrated. This is purely for ease of explanation. The operation of a left-pointing third sensor would be analogous to the operation described below.

On detecting a swath (such as swath 24*a* in FIG. 1) that is suitable for baling the second sensor 38 generates a signal (that typically but not necessarily is an electrical signal). This signal is transmitted to the processing device 41 that then generates a command signal. The command signal is transmitted to the motor, described above, that is secured to and acts on the steering box of the tractor 11. The moving tractor 11 then steers the tractor-baler combination as represented by numeral 10*c* in FIG. 1 in an optimal way to commence baling of the selected swath 24*a* in an optimal way.

Optimisation of the commencement of baling may arise because the baler 12 becomes aligned with the most dense part of the swath 24*a* before the ingestion of crop material commences, or it may result from maneuvering of the tractor 11 so that the baler 12 does not deviate from an optimal trajectory once baling has commenced. Combinations of such effects are possible.

In other embodiments of the invention the first sensor 36 may be moveably (typically but not necessarily pivotably) mounted relative to the tractor 11, such that it can swivel when the tractor-baler combination 10 is moving in the headland as represented by numeral 10*b*.

FIG. 3*a* shows one non-limiting form of pivoting arrangement, in which the sensor 36 is mounted on a rotatably mounted base 51. The outer periphery of base 51 is formed as a toothed pinion as represented by numeral 52. The teeth of pinion 52 are engaged by a worm drive 53 formed on or secured to the exterior of a rotatable shaft 54. Shaft 54 is the output member of a motor such as an electric motor 56. Motor 56 may be a stepper motor or another motor type and may be controlled e.g. by way of a processing device forming part of the tractor 11 to rotate in clockwise and anticlockwise directions as required. This in turn effects a desired degree of controlled rotation of the base 51 and hence the sensor 36.

In an alternative arrangement for causing controlled swivelling of the sensor 36 a kinematic linkage may be adopted as shown in FIG. 3*b*.

In FIG. 3*b* the sensor 36 is shown secured to a mounting bracket 57 that is pivotably secured at one end 58 to e.g. the machine frame of the tractor 11.

At its opposite end 59 the bracket 57 is pivotably secured to a rod 61 forming part of a linear actuator such as a pneumatic or hydraulic ram 62. The opposite end 63 of ram 62 is pivotably secured to the machine frame. As a result extension and retraction of the ram 62 causes swivelling of the field of view 37 of the sensor 36 about pivot 58. As in the case of the FIG. 3*a* arrangement the extent of swivelling of the field of view 37 may be controlled e.g. using a processing device forming part of or operatively connected to the tractor 11.

In such embodiments of the invention the second sensor 38 can be dispensed with. Instead when the tractor moves into a headland such that the first sensor 36 no longer detects any swaths 24 the first sensor may be swivelled to point to one side of the tractor 11 as represented by rotated field of view 42.

At such a time the first sensor may then assume the role of the second sensor 38 described above in detecting swaths 24 that are suitable for baling. As a result the first sensor 36 generates a signal (e.g. an electrical signal) that passes to the processing device 41. The processing device 41 generates a command signal that is fed to the steering box motor and effects steering of the tractor-baler combination for example as represented by numeral 10c in FIG. 1.

Swivelling of the first sensor 36 under such circumstances may occur by a variety of methods. As an example the sensor 36 may rotate from left to right under the power of a motor once the tractor 11 enters the headland and the sensor 36 ceases to detect swaths 24. Such scanning of the field may continue until the sensor 36 detects a swath (such as swath 24a) and as a result generates a swath signal as described.

Alternatively swivelling of the sensor 36 may be effected on the basis of information on the turn described by the tractor. Thus for example if the tractor 11 turns to the right when maneuvering at the end of a field the sensor may be automatically swivelled (say) 30 degrees to the right during the turn in order to align the field of view 37 of the sensor 36 such that it is likely to detect the next swath to be baled. Similarly the sensor 36 can be swivelled automatically to the left on the detection of a turn to the left at the end of the field. The degree and direction of turn may readily be sensed in a tractor having an automatic or semi-automatic steering system in which sensor signals representing the degree of turn of a steering motor may be fed to a processing device.

In many embodiments of the invention it would be desirable for the sensor 36 to be capable of swivelling to the left or the right in order to capture images or data relating to swaths on either side of the tractor-baler combination. As an alternative however it is possible, within the scope of the invention to provide a respective sensor 36 pointing to either side of the tractor. Such sensors 36 may be swivelable or fixed in the sense explained herein. It is possible to include various combinations of fixed and swivelable sensors in one and the same tractor-baler combination 10. As mentioned hereinbelow one or more of the sensors may be mounted on the baler 12 rather than the tractor.

In FIG. 1 the swaths 24 are shown as straight, parallel swaths extending at approximately 90 degrees to the elongate dimension of the headland. However it may be the case that the swaths extend at a non-90 degree angle to the headland, or at least at a non-90 degree angle to the tractor-baler combination 10 when it is maneuvering in the headland. The invention however is beneficial even when this is the case.

FIGS. 2a to 2c show in a non-limiting manner the sequence of movements of the tractor 11 and baler 12 that may result when the tractor 11 initially turns in accordance with the method of the invention in order to align the baler with the end of a swath as illustrated by numeral 10c in FIG. 1.

In FIGS. 2a to 2c the lateral centre of the sensor 36, corresponding to the direction in which the sensor (e.g. camera) 36 points is represented by numeral 44. As is apparent from FIGS. 2a to 2c this line of sight may vary significantly from the line 24 of the swath as the tractor adjusts its direction in accordance with the method of the invention. However the centre of the rear axle of the tractor 11, as represented by numeral 45, follows a line that deviates significantly less from the line 24 of the swath. The centre of the baler pick-up is represented by numeral 48 and the trajectory of the axle of the baler by numeral 46. As is clear from FIGS. 2a to 2c the latter trajectories follow the swath line 24 with very good accuracy, notwithstanding that (as shown by numeral 44) the front wheels 13, 14 of the tractor steer repeatedly in order to achieve this result. Such steering of the front wheels 13, 14 is under the control of steering control elements as described herein.

As explained in some embodiments of the apparatus of the invention one or more sensor 36 is moveable between a first orientation in which it points forwardly of the tractor and a second orientation in which it points sideways of the tractor. In such embodiments the method of the invention optionally may include the step of causing movement of the said sensor between the first and second orientations.

Typically such movement may occur under the influence of one or more motors for swivelling or otherwise moving the sensor 36 between the first and second orientations, but as noted herein other methods of effecting such movement, including manual adjustment of the sensor orientation, e.g. using levers, handles, link ages and/or by manually grasping a pivotably mounted housing of the sensor 36, are possible within the scope of the invention.

When the method of the invention is practised with respect to a tractor-baler combination 10 in which the sensors 36, 38 are fixedly mounted on the tractor the processing device 41 may be programmed or otherwise arranged to cause control of the steering of the tractor to be influenced by the output of the sideways-pointing sensor 38 in preference to the forwardly-pointing sensor 36 when the tractor is moving in a headland.

Such a transition of sensor control may be initiated e.g. when the forwardly-pointing sensor 36 ceases to detect a swath 24 at the end of a baling operation involving following such a swath 24. The processing device 41 may be programmed to identify the transition from baling to headland maneuvering based on one or more of a number of factors, including e.g. the output of the sensor 36, the length of time for which the baler 12 has been ingesting crop material since a previous headland manoeuvre, the output of a GPS module 47 forming part of the tractor 11 or baler 12 or a range of similar parameters of the baling operation.

In addition to the foregoing the invention is considered to reside in a computer-readable medium containing instructions for carrying out a method as defined herein. Such a medium may be in the form of a disk, memory device such as a so-called "memory stick", internal parts of a computer or processor such as processing device 41, or a range of other media as will be known to those of skill in the art.

The invention is described herein with reference to optical sensors but it should be appreciated that a variety of other sensor types may readily be substituted for the optical sensors mentioned. Thus acoustic, radar, Doppler effect and a variety of other sensor types are workable in embodiments of the invention.

Furthermore as indicated the sensors while preferably located on the tractor 11 may alternatively be located on the baler 12, or an arrangement in which e.g. one sensor employed in the invention is tractor-mounted and another is baler-mounted is possible.

As mentioned the tractor 11 may be of a wide range of types, and the invention is not limited to the use or presence of any particular size or design of tractor 11. The tractor 11 may include numerous sub-systems and control devices. These may include a GPS module or other location device. Such a device may be operatively connected to the processing device 41 and may therefore provide assisting impacts that are used to enhance the accuracy of positioning of the tractor 11 in a way that optimises alignment of the trailer 12 in the ways disclosed herein.

The baler 12 may also take a variety of forms. Thus the baler 12 may include numerous ancillary parts, power sources, sensors and location indicating devices as will be known to the person of skill in the art. Also the baler 12 may be connected to the tractor in any of a range of ways as also will be known in the art. All such variants on the basic version of the invention described herein lie within the scope of the claims hereof, and the tractor and baler illustrated in the Figures are exemplary only and do not limit the invention to the types shown.

It furthermore should be noted that references to e.g. swaths 24 being laterally offset with respect to the direction of forward movement of the tractor 11 may also be construed as references to such swaths 24 being laterally offset with respect to the elongate length of the tractor 11 when the tractor 11 is stationary and/or as references to offsetting of the swaths with respect to the direction of forward movement of the baler 12, or the elongate length of the baler 12 when the latter is stationary.

Such lateral offsetting of the swaths 24 as mentioned above may be to any appreciable extent. Thus the invention is not limited to any particular orientation of the swaths 24 that are to be sensed relative to the direction of forward movement of the tractor 11 and/or the baler 12. Moreover although in the majority of cases a field is likely to contain a significant number of swaths 24 extending generally parallel with one another this need not be the case. Thus apparatus and method of the invention are useable in e.g. a field containing a single swath 24, that may be of any length and orientation.

For the avoidance of doubt, the invention is considered to reside in a programmable device as described herein; a computer-readable medium containing instructions for the operation of such a programmable device; and a trailer such as a baler as defined herein, when considered independently of any towing tractor.

The listing or discussion of an apparently prior-published document in this specification should not necessarily be taken as an acknowledgement that the document is part of the state of the art or is common general knowledge.

Preferences and options for a given aspect, feature or parameter of the invention should, unless the context indicates otherwise, be regarded as having been disclosed in combination with any and all preferences and options for all other aspects, features and parameters of the invention.

The invention claimed is:

1. A tractor comprising:
   a vehicle body supported by a plurality of ground-engaging members;
   a steering mechanism configured for steering at least one said ground-engaging member;
   at least one sensor for sensing at least one swath line of crop material corresponding to a quantity of crop material per unit length of a swath, wherein the at least one sensor is mounted to the vehicle body; and
   a controller configured to receive at least one output of the at least one sensor to operate the steering mechanism such that when a baler is connected to the vehicle body, the baler follows said at least one swath line in a manner aligning the ingestion of crop material into the baler for baling,
   wherein the at least one sensor is operable to sense a swath line that is laterally offset from the direction of forward movement of the vehicle body, wherein the at least one sensor swivels to thereby scan a field to detect the swath in the field.

2. The tractor according to claim 1 wherein the at least one sensor is moveable between a first orientation in which it points forwardly of the vehicle body and a second orientation in which it points sideways of the vehicle body.

3. The tractor according to claim 2 including a pivotable mounting securing the at least one sensor relative to the vehicle body, the pivotable mounting permitting at least one degree of freedom of movement of the at least one sensor.

4. The tractor according to claim 2, further comprising at least one motor for effecting movement of the at least one sensor between the first orientation and the second orientation.

5. The tractor according to claim 1 wherein the at least one sensor comprises respective first and second sensors configured for sensing at least one swath line, the first sensor pointing forwardly of the vehicle body and the second sensor pointing sideways of the vehicle body and the orientations of the first and second sensors being fixed with respect to the vehicle body.

6. The tractor according to claim 5 wherein the first sensor is moveable between a first orientation in which it points forwardly of the vehicle body and a second orientation in which it points laterally with respect to the vehicle body.

7. The tractor according to claim 1 wherein the at least one sensor is operatively connected to the controller whereby the at least one sensor is configured for sensing a swath that is laterally offset from the direction of forward movement of the vehicle body the controller operates the steering mechanism such that a towed baler aligns for ingestion of crop material corresponding to the swath line.

8. The tractor according to claim 1 wherein the at least one sensor is an optical device that generates an output derived from a two-dimensional image of the cross-section of a swath captured by the optical device.

9. The tractor according to claim 1 wherein the optical device is operatively coupled to a processor configured to generate a predicted swath line derived from a plurality of two-dimensional images of the cross-section, silhouette or outline of a swath captured sequentially by the optical device as the tractor moves.

10. The tractor according to claim 1 in combination with a baler wherein the baler is pivotally connected to the tractor by a drawbar.

11. A method of controlling a (a) a tractor having a plurality of ground-engaging members and a steering mechanism configured for steering at least one said ground-engaging member; (b) a baler towed behind the tractor; (c) at least one sensor configured for sensing at least one swath line of crop material corresponding to a quantity of crop material per unit length of a swath; and (d) a controller that operates in dependence on at least one output of the at least one sensor to operate the steering mechanism;
    the method comprising the steps of
    pivoting the sensor relative to the tractor using a pivoting arrangement;
    sensing with at least one said sensor swath line that is laterally offset from a direction of forward movement of the tractor while the baler is not following a line of a swath; and
    using the output of the said at least one sensor as an input to the controller whereby to operate the steering mechanism so that the baler is aligned for crop infeed with respect to the laterally offset swath line before the ingestion of crop material commences, wherein the at least one sensor is mounted to the tractor.

12. The method according to claim 11, further comprising moving the at least one sensor between a first and a second orientation wherein the first orientation the at least one sensor points forwardly of the tractor and in the second orientation the at least one sensor points sideways of the tractor.

13. The method according to claim 11 wherein the at least one sensor comprises a first and a second sensor configured for sensing at least one swath line, the first sensor pointing forwardly of the tractor and the second sensor pointing sideways of the tractor and the orientations of the first and second sensors being fixed with respect to the tractor; and the method further comprising operating the steering mechanism with the controller in dependence on the output of the second sensor when the first sensor does not sense a swath line.

14. The tractor according to claim 10, further comprising a forwardly projecting tongue connected to the drawbar, wherein a connection between the forwardly projecting tongue and the drawbar includes a pivot permitting the baler to turn relative to the tractor at least in the plane of the drawbar.

15. The tractor according to claim 1, wherein the at least one sensor is configured to detect the at least one swath line of crop material when at least one of the tractor or an entire tractor-baler combination is travelling in the headland at an angle relative to a direction in which the at least one swath line of crop material extends.

16. The tractor according to claim 1, wherein the at least one sensor is not mounted to the baler.

* * * * *